US008456963B1

(12) United States Patent
Hu et al.

(10) Patent No.: US 8,456,963 B1
(45) Date of Patent: Jun. 4, 2013

(54) METHOD AND SYSTEM FOR AN ENERGY ASSISTED MAGNETIC RECORDING HEAD HAVING A SUSPENSION-MOUNTED LASER

(75) Inventors: Yufeng Hu, Fremont, CA (US); Ruolin Li, Milpitas, CA (US); Ut Tran, San Jose, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 447 days.

(21) Appl. No.: 12/758,319

(22) Filed: Apr. 12, 2010

(51) Int. Cl.
G11B 11/00 (2006.01)

(52) U.S. Cl.
USPC .................................... 369/13.33; 369/13.13

(58) Field of Classification Search
USPC ........ 369/13.33, 13.13, 13.32, 13.02, 112.09, 369/112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| 5,199,090 | A | 3/1993 | Bell |
| 6,075,673 | A * | 6/2000 | Wilde et al. ................... 369/300 |
| 6,181,673 | B1 | 1/2001 | Wilde et al. |
| 6,404,706 | B1 | 6/2002 | Stovall et al. |
| 7,151,738 | B2 | 12/2006 | Peng |
| 7,272,102 | B2 | 9/2007 | Challener |
| 8,024,748 | B1 * | 9/2011 | Moravec et al. ............... 720/659 |
| 8,134,794 | B1 * | 3/2012 | Wang .............................. 360/59 |
| 8,279,719 | B1 | 10/2012 | Hu et al. |
| 2003/0007279 | A1 * | 1/2003 | Johnson et al. .................. 360/75 |
| 2003/0123335 | A1 | 7/2003 | Rettner et al. |
| 2004/0062503 | A1 | 4/2004 | Challener |
| 2004/0202054 | A1 * | 10/2004 | Hesselink et al. ......... 369/13.02 |
| 2005/0052771 | A1 | 3/2005 | Rausch et al. |
| 2005/0190494 | A1 | 9/2005 | Lee et al. |
| 2005/0190496 | A1 | 9/2005 | Hamann et al. |
| 2005/0190682 | A1 * | 9/2005 | Gage et al. ................ 369/112.29 |
| 2005/0254355 | A1 | 11/2005 | Rettner et al. |
| 2006/0233061 | A1 * | 10/2006 | Rausch et al. .............. 369/13.32 |
| 2006/0233062 | A1 | 10/2006 | Bedillion et al. |
| 2006/0256694 | A1 | 11/2006 | Chu et al. |
| 2007/0036040 | A1 | 2/2007 | Mihalcea et al. |
| 2007/0153417 | A1 | 7/2007 | Suh et al. |
| 2007/0159720 | A1 | 7/2007 | Sohn et al. |
| 2007/0230047 | A1 | 10/2007 | Jin et al. |
| 2007/0297082 | A1 | 12/2007 | Peng et al. |
| 2008/0002298 | A1 | 1/2008 | Sluzewski |
| 2008/0013912 | A1 | 1/2008 | Shukh et al. |
| 2008/0055343 | A1 | 3/2008 | Cho et al. |
| 2008/0123219 | A1 | 5/2008 | Gomez et al. |
| 2009/0290454 | A1 | 11/2009 | Fontana, Jr. et al. |
| 2010/0002549 | A1 * | 1/2010 | Oumi et al. ................ 369/13.02 |
| 2010/0123965 | A1 | 5/2010 | Lee et al. |
| 2010/0165822 | A1 | 7/2010 | Balamane et al. |
| 2010/0214685 | A1 | 8/2010 | Seigler et al. |
| 2011/0007612 | A1 * | 1/2011 | Tanabe et al. .............. 369/13.33 |

* cited by examiner

Primary Examiner — Tan X Dinh

(57) ABSTRACT

An energy assisted magnetic recording (EAMR) disk drive comprises a suspension and a slider having a back side, a laser-facing surface, and an air-bearing surface (ABS) opposite the back side. The slider is mounted to the suspension on the back side. The disk drive further comprises an EAMR transducer coupled with the slider, a portion of the EAMR transducer residing in proximity to the ABS and on the laser-facing surface of the slider. The disk drive further comprises a laser coupled with the suspension and having a light emitting surface facing the laser-facing surface of the slider. The laser has an optic axis substantially parallel to the suspension. The laser provides energy substantially along the optic axis and is optically coupled with the EAMR transducer via free space. The EAMR transducer receives the energy from the laser and writes to the media using the energy.

23 Claims, 7 Drawing Sheets

Side View

Perspective View

ABS View

Side View

METHOD AND SYSTEM FOR AN ENERGY ASSISTED MAGNETIC RECORDING HEAD HAVING A SUSPENSION-MOUNTED LASER

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Other components that may be part of the conventional EAMR disk drive 10 are not shown. The conventional slider 20 is typically attached to the suspension at its back side 24. A conventional EAMR transducer 28 is coupled with the slider 20.

The laser diode 30 is coupled in proximity to the EAMR transducer 28 on the trailing edge 26 of the slider 20. Light from the conventional laser diode 30 is provided substantially along the optic axis of the conventional laser diode 30 to the trailing edge 26 of the slider 20. Thus, the laser diode 30 may be oriented at a nonzero angle from the back side 24 of the slider 20. Light may be provided via an optical component 32. Although shown as a line, the optical component may be a fiber, a mirror, a lens, another optical component, or some combination thereof. Light from the laser diode 30 is provided to a grating (not shown) of conventional EAMR transducer 28. The light from the laser diode 30 coupled into the grating is then provided to a waveguide (not shown). The waveguide directs the light toward the conventional media 12, heating a small region of the conventional media 12. The conventional EAMR transducer 28 magnetically writes to the conventional media 12 in the region the conventional media 12 is heated.

Although the conventional EAMR disk drive 10 may function, improvements are desired. More specifically, aligning the laser 30 and optical component 32 to the desired position with respect to the conventional transducer 28 is time consuming and prone to error. The throughput and yield of a manufacturing for fabricating the conventional EAMR disk drive 10 may thus be adversely affected. Misalignment of the laser 30 with respect to the EAMR transducer 28 may also negatively impact performance of the conventional EAMR disk drive 10.

Accordingly, what are needed are improved methods and systems for fabricating EAMR disk drives.

BRIEF SUMMARY OF THE INVENTION

A method and system for providing an energy assisted magnetic recording (EAMR) disk drive are described. The method and system include providing a suspension, a slider, at least one EAMR transducer, and at least one laser. The slider has a back side, a laser-facing surface, and an air-bearing surface (ABS) opposite to the back side. The slider is mounted to the suspension on the back side. The EAMR transducer(s) are coupled with the slider. At least a portion of the EAMR transducer resides in proximity to the ABS and on the laser-facing surface of the slider. Each laser is coupled with the suspension and has a light emitting surface facing the laser-facing surface of the slider. Each laser also has an optic axis substantially parallel to the suspension. The laser provides energy substantially along the optic axis and is optically coupled with the EAMR transducer via free space. The EAMR transducer(s) receive the energy from the laser(s) and write to the media using the energy.

DETAILED DESCRIPTION OF EMBODIMENTS OF THE INVENTION

Figure 1:
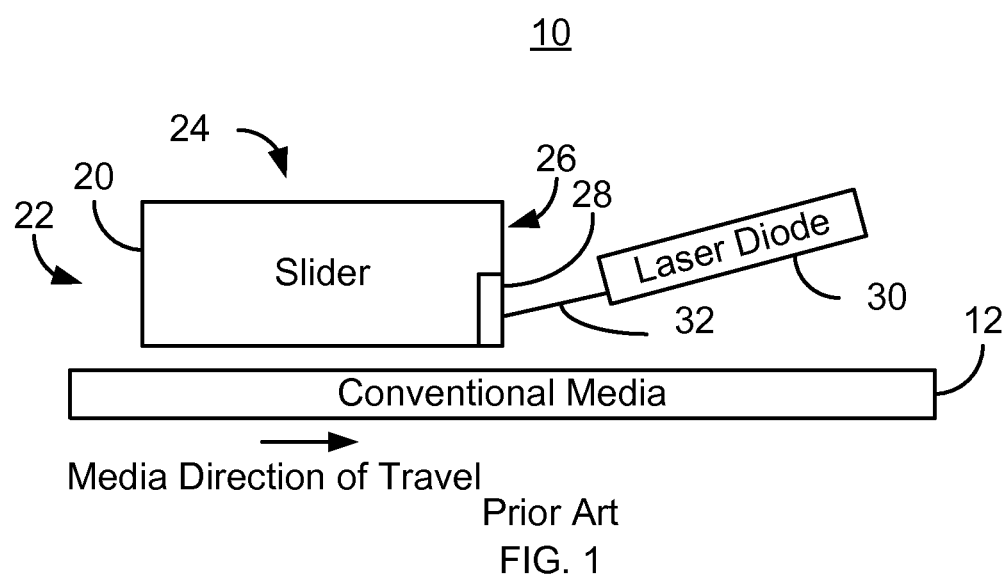
FIG. 1 is a diagram depicting a portion of a conventional energy assisted magnetic recording disk drive.
Figure 2:
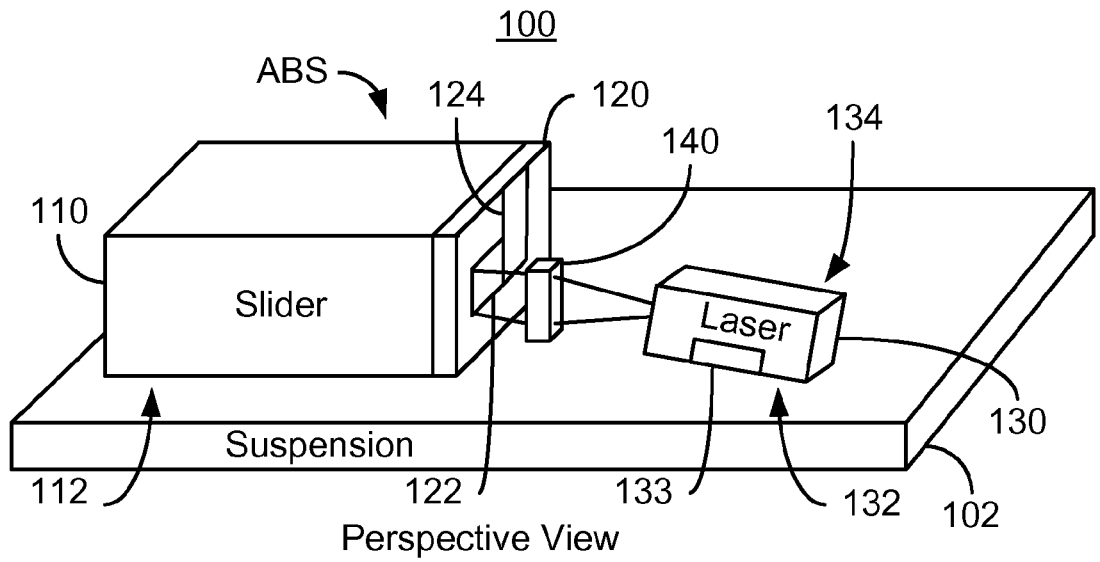
FIG. 2 is a diagram depicting an exemplary embodiment of an EAMR disk drive.
Figure 2:
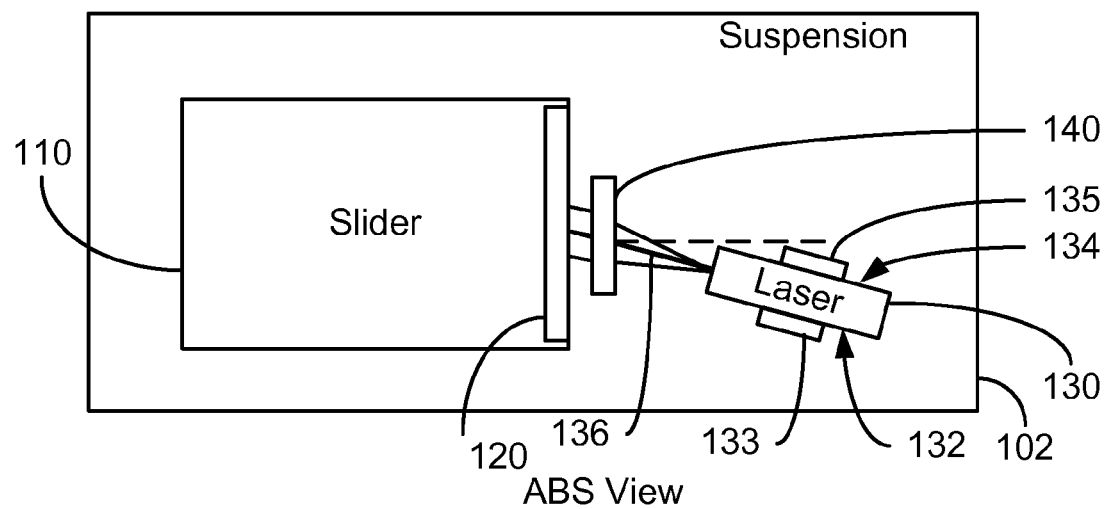
Figure 2:
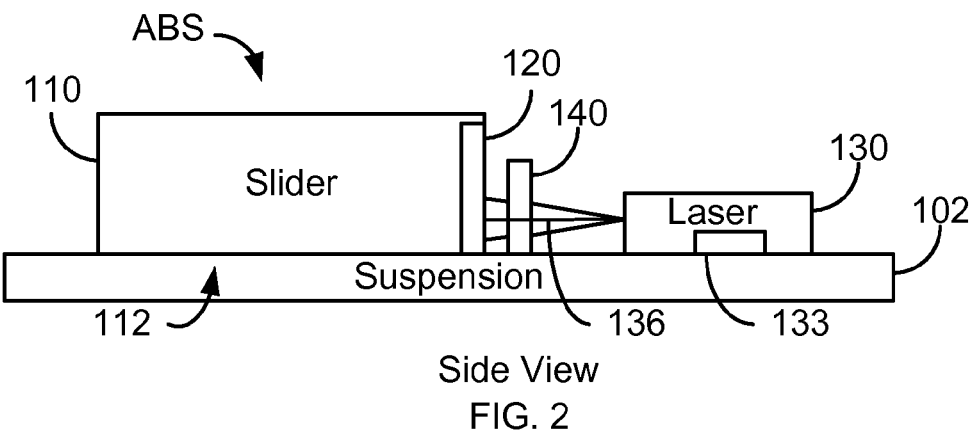

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. In addition, although the EAMR disk drive 100 is described in the context of single components, multiple components may be used. For example, although described as including a single laser and a single EAMR transducer, the EAMR disk drive 100 may include multiple lasers and/or multiple EAMR transducers. The EAMR disk drive 100 includes suspension 102, a slider 110, an EAMR transducer 120, laser 130, and optional optics 140. The EAMR transducer 120 is optically coupled with the laser 130.

The EAMR transducer 120 is coupled with the slider 110. Although described as coupled to the slider 110, the EAMR transducer 120 may be considered to be fabricated as part of the slider 110. A read transducer (not shown in FIG. 2) may also be fabricated on the slider 110'. The EAMR transducer 120 includes grating(s) 122 and waveguide(s) 124. In addition, the EAMR transducer 120 may include write pole(s), coil(s), shield(s) and optionally other structures that are not shown in FIG. 2. The EAMR transducer 120 and slider 110 also have an air-bearing surface (ABS) configured to reside in proximity to a media (not shown) during use. In one embodiment, the EAMR transducer 120 is optically coupled to the laser 130 through the grating 122. The grating(s) 122 coupled energy from the laser 130 to the waveguide(s) 124. The waveguide(s) 124 are for directing the energy from the laser 104 toward the ABS.

The laser 130 and optics 140 are coupled with the suspension 102. In some embodiments, the laser 130 is a laser diode. The laser 130 may thus include a P-side 132 having P-side contact 133 and an N-side 134 having an N-side contact 135. Thus, in the embodiment shown, the laser 130 is mounted to the suspension via a surface between the P-side 132 and the N-side 134. Stated differently, the P-side 132 and the N-side 134 may be mounted so that they stand off from and, in some embodiments, are substantially perpendicular to the surface of the suspension 102.

Energy, typically in the form of light in the optical range of the spectrum, is emitted from the laser 130. The energy travels generally along the optic axis 136 of the laser 130. This optic axis 136 is substantially parallel to the back side of the slider 110 that is mounted to the suspension 102. However, there is generally at least some divergence in the beam of energy from the laser 130. The energy from the laser 130 may reach the optics 140 via free space. The optics 140 redirects the energy from the laser 130 to the EAMR transducer 120. In some embodiments, the optics 140 both collimates and redirects the energy toward the EAMR transducer 120. Thus, the energy from the laser 130 may be coupled to the grating 122 via optics 140. In other embodiments, the optics 140 may be omitted. In such embodiments, energy from the laser 130 is coupled to the grating 122 via free space.

In operation, light from the laser 130 is provided to the optics 140, then to the grating 122 or directly to the grating 122. The grating 122 is optically coupled with the waveguide 124. In addition, a near-field transducer (NFT) (not shown in FIG. 2) may also be used to further focus the energy from the waveguide onto a small spot on the media. The waveguide directs the energy from the grating 122 to the NFT and/or the ABS. Thus, a small region of the media is heated. The EAMR transducer 120 may write data to the media while the media is heated.

The EAMR disk drive 100 may have improved manufacturability and performance. Energy from the laser 130 may be provided to the EAMR transducer 120 via free space. Further, because there may be more space on the suspension 102, the laser 130 may be aligned at the desired angle for optimal coupling efficiency. As a result, performance of the EAMR disk drive 100 may be enhanced. Further, the laser 130 and the slider 110 may be mounted on a flat carrier such as the suspension 102 or another carrier (not shown) coupled to the suspension 102. Thus, alignment marks on the suspension 102 or carrier may be used to align the slider 110 (and thus the transducer 120) with the laser 130. Consequently, accurate alignment may be achieved in a high volume process. In embodiments in which the P-side 132 and N-side 134 of the laser 130 are oriented off of the suspension 102, as shown in FIG. 2, the laser 130 may be mounted by solder bonding or analogous techniques. Thus, bonding of the laser 130 may be more compatible with backend processes. In addition, the laser 130 may be heat sinked directly to the suspension 102. For example, solder on contact pads may provide a direct heat path to the suspension 102. This may alleviate heating issues for the laser 130. Thus, performance and manufacturing of the EAMR disk drive 100 may be enhanced.

Figure 3:
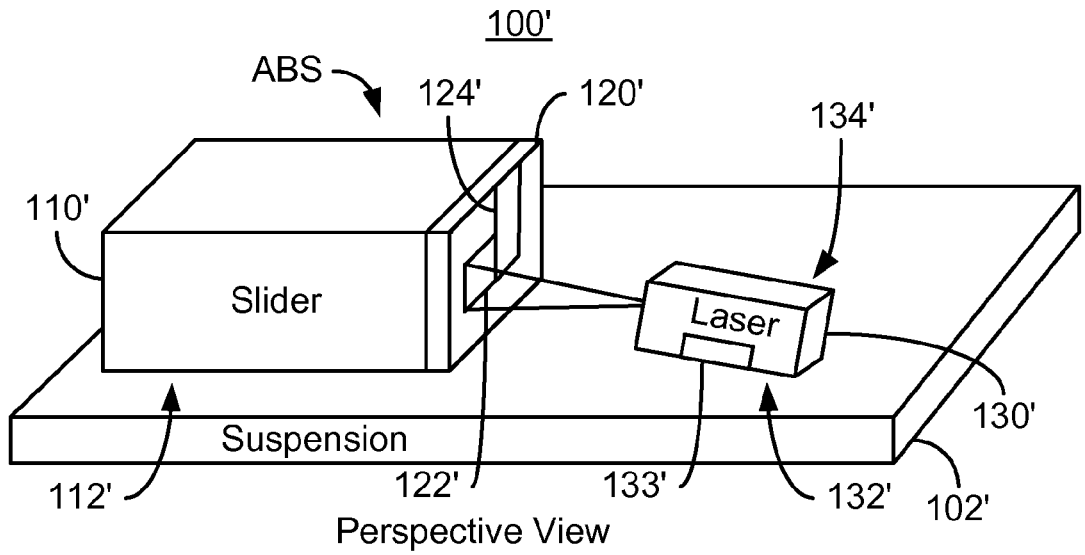
FIG. 3 is a diagram depicting an exemplary embodiment of an EAMR disk drive.
Figure 3:
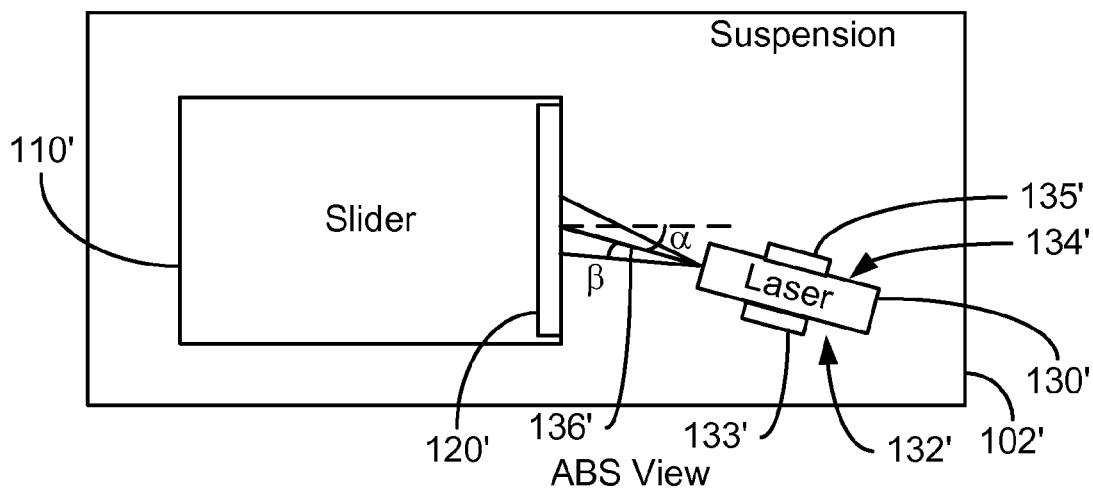
Figure 3:
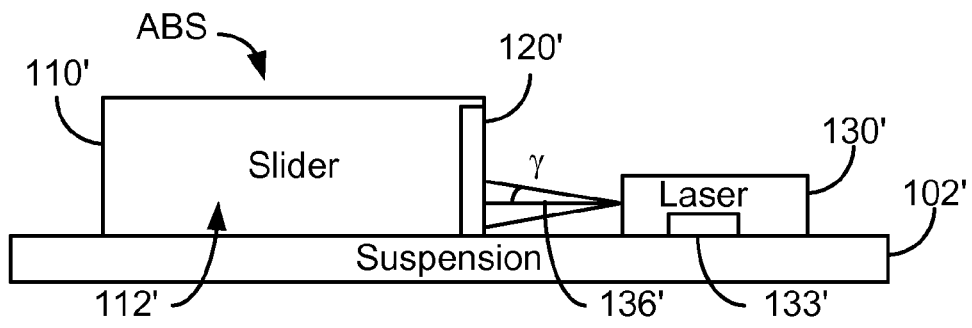

FIG. 3 is a diagram depicting an exemplary embodiment of an EAMR disk drive 100'. For clarity, FIG. 3 is not to scale. For simplicity not all portions of the EAMR disk drive 100' are shown. In addition, although the disk drive 100' is depicted in the context of particular components other and/or different components may be used. Further, the arrangement of components may vary in different embodiments. In addition, although the EAMR disk drive 100' is described in the context of single components, multiple components may be used. For example, although described as including a single laser and a single EAMR transducer, the EAMR disk drive 100' may include multiple lasers and/or multiple EAMR transducers. The EAMR disk drive 100' is analogous to the EAMR disk drive 100 depicted in FIG. 2. Analogous components are, therefore, labeled similarly. For example, the EAMR disk drive 100' thus includes media (not shown), suspension 102', a slider 110', an EAMR transducer 120' having a grating 122' and a waveguide 124', and laser 130' corresponding to the suspension 102, slider 110, EAMR transducer 120, and laser 130, respectively. The EAMR transducer 120 is optically coupled with the laser 130.

The EAMR transducer 120' is coupled with the slider 110'. In some embodiments, the EAMR transducer 120' may be considered to be fabricated as part of the slider 110'. A read transducer (not shown in FIG. 3) may also be fabricated on the slider 110'. In addition to the grating 122' and waveguide 124', the EAMR transducer 120' may include write pole(s), coil(s), shield(s) and optionally other structures that are not shown in FIG. 3. The EAMR transducer 120' and slider 110' also have an ABS configured to reside in proximity to a media (not shown) during use. The EAMR transducer 120' is optically coupled to the laser 130' through the grating 122'.

The laser 130' and slider 110' are coupled with the suspension 102'. In some embodiments, the laser 130' and slider 110' are coupled to a carrier, which is affixed to the suspension 102'. In other embodiments, the laser 130' and slider 110' may be coupled directly to the suspension 102'. The laser 130' has an optic axis 136' along which energy is emitted. However, there is some spread, β, in the beam. In particular, there is a spread, β, parallel to the plane of the suspension 102', and γ substantially perpendicular to the plane of the suspension 102'. In some embodiments, the laser 130' is a laser diode including a P-side 132' having P-side contact 133' and an N-side 134' having an N-side contact 135'. Thus, in the embodiment shown, the laser 130' is mounted to the suspension via a surface between the P-side 132' and the N-side 134'. The P-side 132' and the N-side 134' may be mounted so that they stand off from and, in some embodiments, are substantially perpendicular to the surface of the suspension 102'

In the embodiment shown, the laser 140' is mounted such that the optic axis 136' is at an angle, α, with respect to normal to the trailing surface of the slider 110'. In the embodiment shown, α is nonzero. The optic axis 136' is also parallel to the surface of the suspension 102', or other carrier to which the laser 130' is affixed. The optic axis 136' is also generally parallel to the back side of the slider 110' that is mounted to the suspension 102' or carrier. The energy from the laser 130' is coupled to the grating 122' via free space.

The EAMR disk drive 100' operates in an analogous manner to the EAMR disk drive 100. Thus, energy from the laser 130' is provided along the optic axis 136' and coupled into the EAMR transducer 120' via the grating 122'. The grating 122' is optically coupled with the waveguide 124'. The waveguide 124' directs the energy toward the media (not shown). In addition, an NFT (not shown in FIG. 3) may also be used to further focus the energy from the waveguide 124' onto a small spot on the media. Thus, a small region of the media is heated and may be written to using the EAMR transducer 130'.

The EAMR disk drive 100' may have improved manufacturability and performance. Energy from the laser 130' may be provided to the EAMR transducer 120' via free space. Further, because there may be more space on the suspension 102' or other analogous carrier, sufficient space to align the laser 130' as desired may be available. Thus, the laser 130' may be aligned at the desired angle, α, for optimal coupling efficiency. As a result, performance of the EAMR disk drive 100' may be enhanced. Further, the laser 130' and the slider 110' may be passively aligned using alignment marks (not shown) on the suspension 102' or other carrier. Consequently, accurate alignment may be achieved in a high volume process. In embodiments in which the P-side 132' and N-side 134' of the laser 130' are oriented off of the suspension 102', as shown in FIG. 3, the laser 130' may be mounted by solder bonding or analogous techniques. Thus, bonding of the laser 130' may be more compatible with backend processes. In addition, the laser 130' may have a direct heat path to the suspension 102', for example through solder on contact pads used to bond the laser 130' to the suspension 102'. Heating issues for the laser 130' may thus be addressed. Finally, the divergence, γ, of the beam perpendicular to the suspension 102' is less, allowing for the grating 122' to be narrower. Consequently, the fabrication of the waveguide 120' may also be simplified. Thus, performance and manufacturing of the EAMR disk drive 100' may be enhanced.

Figure 4:
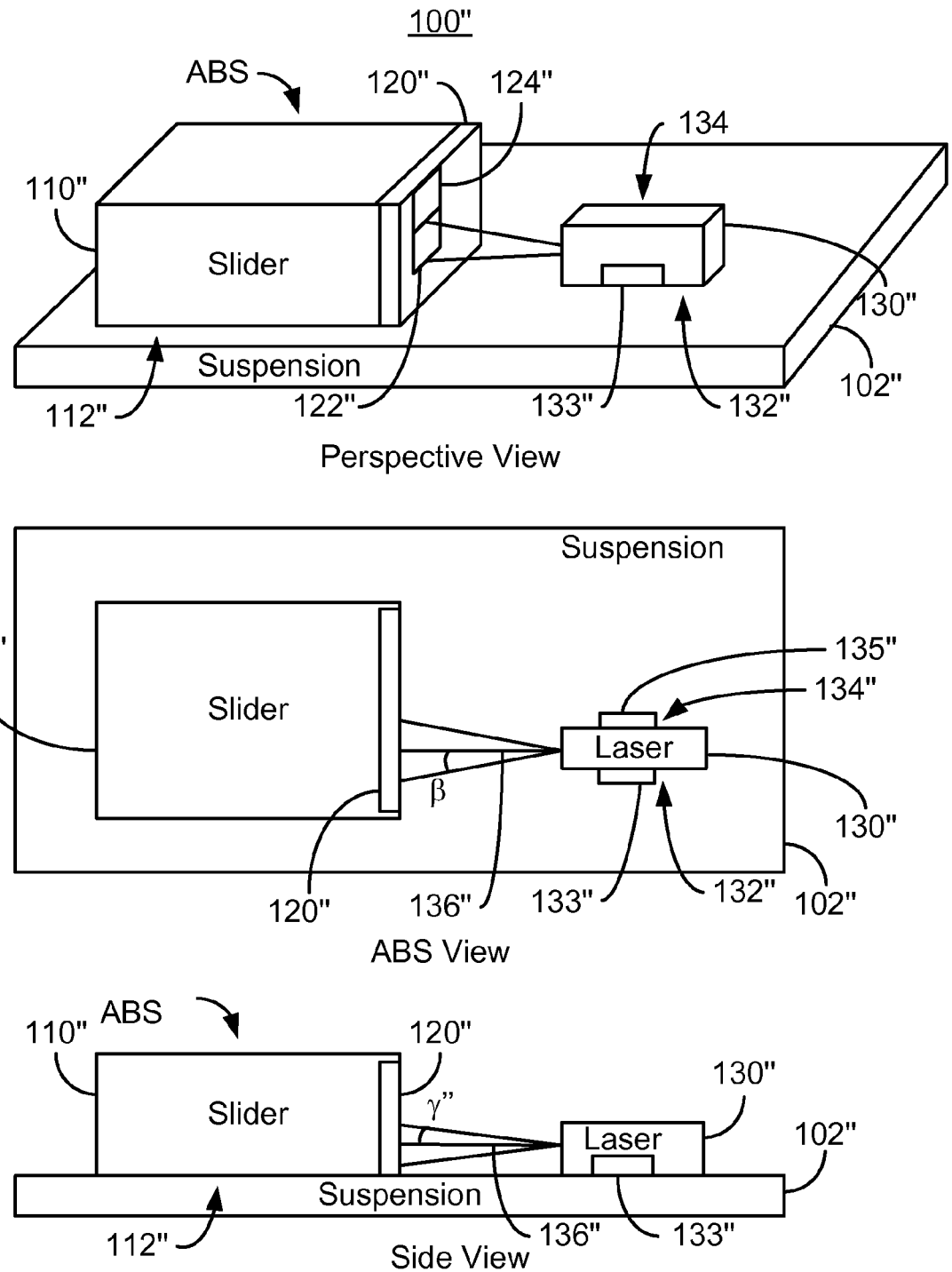
FIG. 4 is a diagram depicting an exemplary embodiment of an EAMR disk drive.

FIG. 4 is a diagram depicting an exemplary embodiment of an EAMR disk drive 100". For clarity, FIG. 4 is not to scale. For simplicity not all portions of the EAMR disk drive 100" are shown. In addition, although the disk drive 100" is depicted in the context of particular components other and/or different components may be used. Further, the arrangement of components may vary in different embodiments. In addition, although the EAMR disk drive 100" is described in the context of single components, multiple components may be used. For example, although described as including a single laser and a single EAMR transducer, the EAMR disk drive 100" may include multiple lasers and/or multiple EAMR transducers. The EAMR disk drive 100" is analogous to the EAMR disk drives 100/100' depicted in FIGS. 2-3. Analogous components are, therefore, labeled similarly. For example, the EAMR disk drive 100" thus includes media (not shown), suspension 102", a slider 110", an EAMR transducer 120" having a grating 122" and a waveguide 124", and laser 130" corresponding to the suspension 102/102', slider 110/110', EAMR transducer 120/120', and laser 130/130', respectively. The EAMR transducer 120 is optically coupled with the laser 130.

The EAMR transducer 120" is coupled with the slider 110". In some embodiments, the EAMR transducer 120" may be considered to be fabricated as part of the slider 110". A read transducer (not shown in FIG. 4) may also be fabricated on the slider 110". In addition to the grating 122" and waveguide 124", the EAMR transducer 120" may include write pole(s), coil(s), shield(s) and optionally other structures that are not shown in FIG. 4. The EAMR transducer 120" and slider 110" also have an ABS configured to reside in proximity to a media (not shown) during use. The EAMR transducer 120" is optically coupled to the laser 130" through the grating 122".

The laser 130" and slider 110" are coupled with the suspension 102". In some embodiments, the laser 130" and slider 110" are coupled to a carrier, which is affixed to the suspension 102". In other embodiments, the laser 130" and slider 110" may be coupled directly to the suspension 102". The laser 130" has an optic axis 136" along which energy is emitted. However, there is some spread in the beam. More specifically, the beam diverges by β' in the plane of the suspension 102 and γ' perpendicular to this plane. In some embodiments, the laser 130" is a laser diode including a P-side 132" having P-side contact 133" and an N-side 134" having an N-side contact 135". Thus, in the embodiment shown, the laser 130" is mounted to the suspension via a surface between the P-side 132" and the N-side 134". The P-side 132" and the N-side 134" may be mounted so that they stand off from and, in some embodiments, are substantially perpendicular to the surface of the suspension 102".

In the embodiment shown, the laser 140" is mounted such that the optic axis 136" is normal to the trailing surface of the slider 110". In other words, α is zero. The optic axis 136" is also parallel to the surface of the suspension 102", or other carrier to which the laser 130" is affixed. The optic axis 136" is also generally parallel to the back side of the slider 110" that is mounted to the suspension 102" or carrier. The energy from the laser 130" is coupled to the grating 122" via free space. The EAMR disk drive 100" operates in an analogous manner to the EAMR disk drives 100/100'. Thus, the EAMR disk drive 100" has analogous benefits to the disk drives 100 and 100'.

Figure 5:
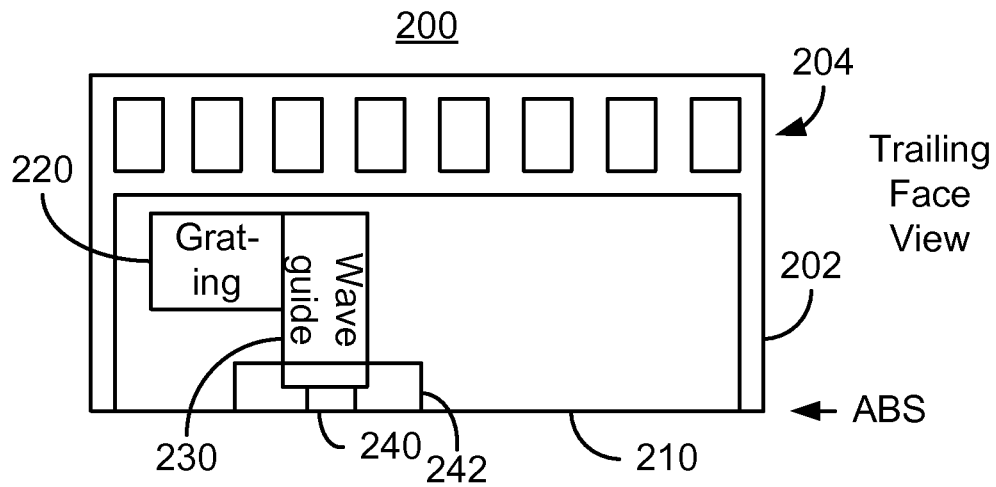
FIG. 5 is a diagram depicting an exemplary embodiment of an EAMR head.

FIG. 5 is a diagram depicting an exemplary embodiment of an EAMR head 200. The head may be used in the disk drive 100, 100', 100". In particular, a trailing face view of the slider 202 and some components coupled to the slider 202 are shown. For clarity, FIG. 5 is not to scale. For simplicity not all portions of the EAMR head 200 are shown. In addition, although the head 200 is depicted in the context of particular components other and/or different components may be used. Further, the arrangement of components may vary in different embodiments. The EAMR head 200 is analogous to the slider 102/102'/120" and EAMR transducer 110/110'/110" depicted in FIGS. 2-4. The EAMR head 200 thus includes a slider 202, an EAMR transducer 210 having one or more gratings 220, magnetic components 242 and NFT 240. However, in alternate embodiments, the NFT 240 may be omitted. The waveguide 230 directs energy from the grating(s) 220 toward the ABS. The waveguide 230 may have various configurations, described below, to facilitate use of the NFT 240 and coupling of the energy to the media. For example, the waveguide 230 may be tapered to focus the energy to a smaller spot size and provide the desired polarization at the appropriate location.

Figure 6:
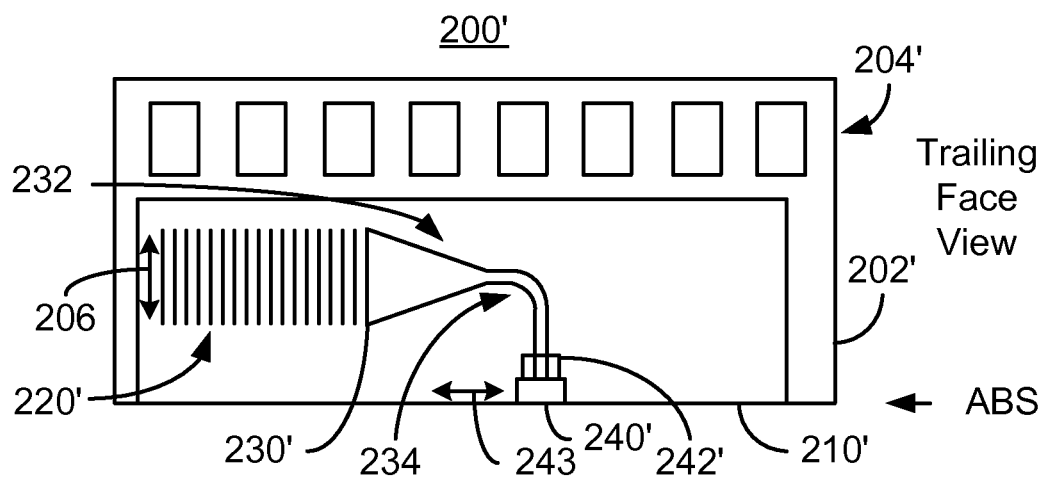
FIG. 6 is a diagram depicting an exemplary embodiment of an EAMR head.

FIG. 6 depicts an exemplary embodiment of a portion of an EAMR head 200'. In particular, a trailing face view of the slider and some components coupled to the slider are shown. For clarity, FIG. 6 is not to scale. For simplicity not all portions of the EAMR head 200' are shown. In addition, although the head 200' is depicted in the context of particular components other and/or different components may be used. Further, the arrangement of components may vary in different embodiments. The EAMR head 200' is analogous to the EAMR head 200' and the sliders 102/102'/102" and transducers 110/110'/110". The EAMR head 200' includes media (not shown), suspension (not shown), a slider 202', bond pads 204', an EAMR transducer 210'. The EAMR transducer 210' includes a grating 220', a waveguide 230', NFT 240', and magnetic components 242' such as a pole that are analogous to the grating 220, waveguide 230, NFT 240, and magnetic components 242, respectively. The waveguide 230' includes a tapered portion 232 and a bending portion 234. The tapered portion 232 allows the energy from the laser to be focused to a smaller spot size. The bending portion 234 allows for a change in direction of the light coupled into the grating 206. In the embodiment shown, the bending portion 234 redirects the energy through an angle of at least eighty and not more than one hundred degrees. In some such embodiments, the light is bent by approximately ninety degrees. In other embodiments, the light may be redirected over an angle of at least thirty and not more than one hundred twenty degrees. In the embodiment shown, the light incident on the grating 220' has a polarization 206 that is perpendicular to the ABS and, therefore, perpendicular to the plane of the suspension 102/102'/102". The bending portion 234 not only redirects the light, but also alters the direction of the polarization. Thus, the polarization 243 of the light at the NFT 240' is substantially parallel to the ABS. For example, the EAMR head 200' may be used in the EAMR disk drive 100, 100', and/or 100".

Figure 7:
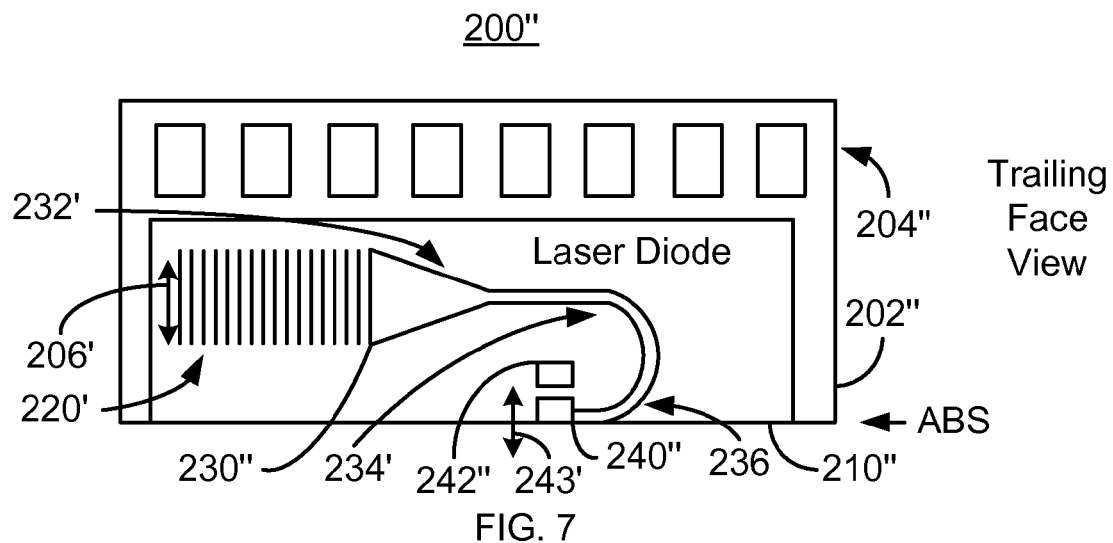
FIG. 7 is a diagram depicting an exemplary embodiment of an EAMR head.

FIG. 7 depicts an exemplary embodiment of a portion of an EAMR head 200". In particular, a trailing face view of the slider and some components coupled to the slider are shown. For clarity, FIG. 7 is not to scale. For simplicity not all portions of the EAMR head 200" are shown. In addition, although the head 200" is depicted in the context of particular components other and/or different components may be used. Further, the arrangement of components may vary in different embodiments. The EAMR head 200" is analogous to the EAMR heads 200/200' and the sliders 102/102'/102" and transducers 110/110'/110". The EAMR head 200" includes media (not shown), suspension (not shown), a slider 202", bond pads 204", an EAMR transducer 210". The EAMR transducer 210" includes a grating 220", a waveguide 230", NFT 240", and magnetic components 242" such as a pole that are analogous to the grating 220, waveguide 230, NFT 240, and magnetic components 242, respectively. The waveguide 230" includes a tapered portion 232' and bending portions 234' and 236. The tapered portion 232' focuses the energy from the laser 130/130'/130" to a smaller spot size. The bending portions 234' and 236 allow for a change in direction of the light coupled into the grating 206. In the embodiment shown, the bending portions 234 and 236 redirect the energy through an angle of at least one hundred and twenty degrees and not more than one hundred ninety degrees. The light incident on the grating 220" has a polarization 206' that is perpendicular to the ABS and, therefore, perpendicular to the plane of the suspension 102/102'/102". The bending portions 234' and 236 not only redirect the light, but also set the direction of the polarization. Thus, the polarization 243' of the light at the NFT 240' is substantially perpendicular to the ABS. For example, the EAMR head 200" may be used in the EAMR disk drive 100, 100', and/or 100".

Figure 8:
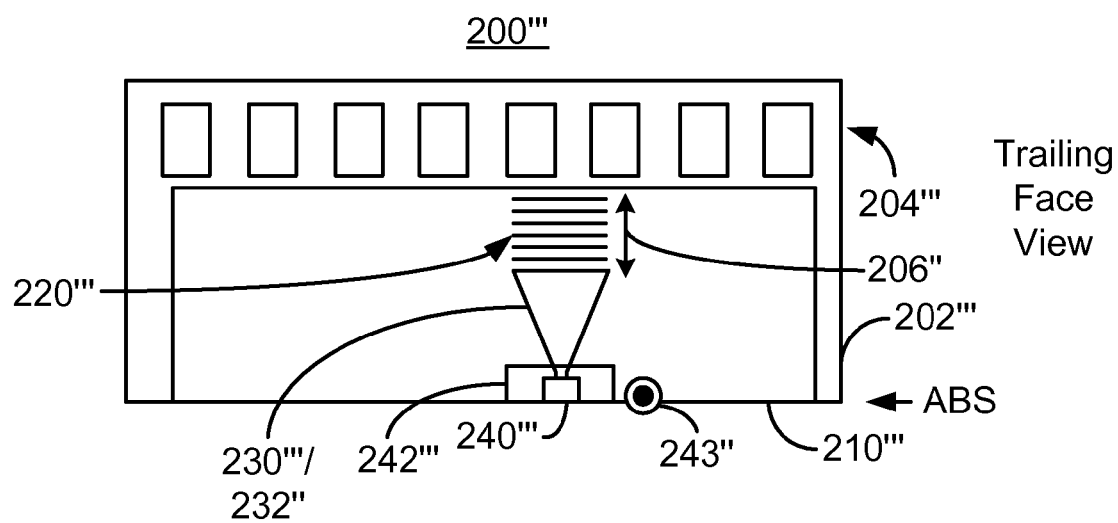
FIG. 8 is a diagram depicting an exemplary embodiment of an EAMR head.

FIG. 8 depicts an exemplary embodiment of a portion of an EAMR head 200'''. In particular, a trailing face view of the slider and some components coupled to the slider are shown. For clarity, FIG. 8 is not to scale. For simplicity not all portions of the EAMR head 200''' are shown. In addition, although the head 200''' is depicted in the context of particular components other and/or different components may be used. Further, the arrangement of components may vary in different embodiments. The EAMR head 200''' is analogous to the EAMR heads 200/200'/200" and the sliders 102/102'/102" and transducers 110/110'/110". The EAMR head 200''' includes media (not shown), suspension (not shown), a slider 202''', bond pads 204''', an EAMR transducer 210'''. The EAMR transducer 210''' includes a grating 220''', a waveguide 230''', NFT 240''', and magnetic components 242''' such as a pole that are analogous to the grating 220, waveguide 230, NFT 240, and magnetic components 242, respectively. The waveguide 230''' includes a tapered portion 232'', but no bending portions. The tapered portion 232'' focuses the energy from the laser 130/130'/130" to a smaller spot size. The light incident on the grating 220''' has a polarization 206'' that is perpendicular to the ABS and, parallel to the trailing face of the EAMR disk drive 200'''. The polarization directions are thus tailored by the head 200'''. Thus, the polarization 243'' of the light at the NFT 240' is substantially perpendicular to the trailing surface, but parallel to the ABS. For example, the EAMR head 200''' may be used in the EAMR disk drive 100, 100', and/or 100".

Thus, using the EAMR heads 200/200'/200"/200''' in connection with the EAMR disk drive 100/100'/100" provides the benefits of the disk drives 100/100'/100". In addition, flexibility of the configuration is achieved. More specifically, the light may be bent around structure in the EAMR head 200. Further, the desired polarization may be achieved at the ABS. Thus, flexibility and performance may be enhanced.

Figure 9:
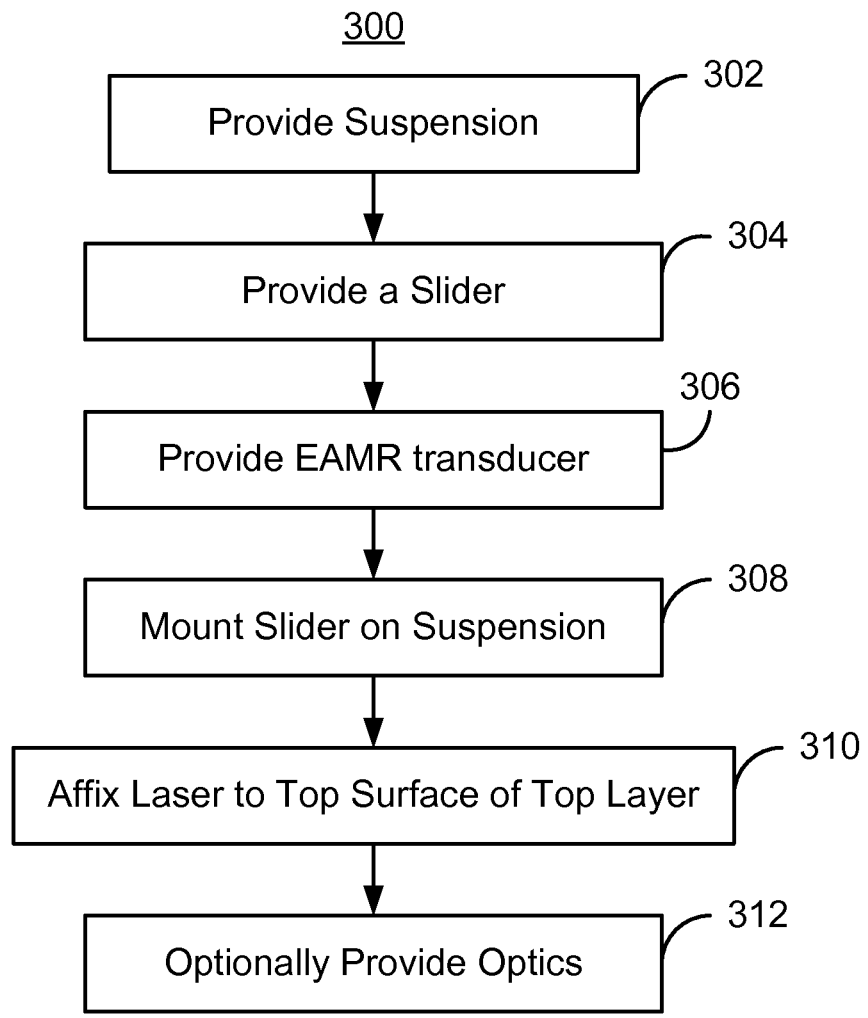
FIG. 9 is a flow chart depicting an exemplary embodiment of a method for providing an EAMR head.

FIG. 9 is a flow chart depicting an exemplary embodiment of a method 300 for providing an EAMR head. Although certain steps are shown, some steps may be omitted, interleaved, performed in another order, and/or combined. The EAMR disk drive being fabricated may include a transducer that is part of a merged head, each of which includes an EAMR write transducer, a read transducer (not shown) and resides on a slider. The EAMR transducer includes optical components, such as gratings, waveguides, and near-field transducers (NFTs), as well as magnetic components such as poles, shields, and coils. The method 300 is described in the context of providing a single EAMR head. However, the method 300 may be used in providing multiple EAMR heads substantially simultaneously. The method 300 is also described in the context of providing particular layers and components. However, the layers and components may include sublayers and subcomponents, respectively. For simplicity, the method 300 is described in the context of the EAMR disk drive 100 and commences after the EAMR transducer 110 has been fabricated. However, the method 300 may be used in fabricating another EAMR head.

Referring to FIGS. 2 and 9, a suspension 102 is provided, via step 302. A slider 110 is provided, via step 304. The EAMR transducer 120 coupled with the slider 110 is provided, via step 306. Step 306 may include fabricating the EAMR transducer on the trailing face of the slider. The EAMR transducer 120 is to face the laser 130. In addition, step 306 may include fabricating the transducer 200, 200', 200", or 200'''. Thus, the waveguide 230, 230', 230", or 230''' may be formed in step 306. The slider 102 is mounted on the suspension 102, via step 308. Conventional bonding processes may be used to attach the slider 110 to the suspension 102. The slider 110 is mounted via the slider back side. The laser 130 is coupled with the suspension 102, via step 310. The laser has a light emitting surface that faces the laser-facing surface of the slider 102. The laser 130 has an optic axis 136 substantially parallel to the suspension 102. Thus, the laser 130 provides energy substantially along the optic axis 136 and is optically coupled with the EAMR transducer 110 via free space. The optics 140 may optionally be provided and coupled to the suspension 102, via step 312. The EAMR transducer 110 thus receives the energy from the laser 110 and writes to the media using the energy.

Using the method 300, the EAMR disk drives 100, 100', 100" and transducers 210/210'/210" may be fabricated. As a result, the EAMR disk drives 100/100'/100" may have improved performance.

We claim:

1. An energy assisted magnetic recording (EAMR) disk drive comprising:
   a suspension,
   a slider having a back side, a laser-facing surface, and an air-bearing surface (ABS) opposite the back side, the slider being mounted to the suspension on the back side, the laser-facing surface being substantially perpendicular to the suspension;
   at least one EAMR transducer coupled with the slider, at least a portion of the EAMR transducer residing in proximity to the ABS and on the laser-facing surface of the slider; and
   at least one laser coupled with the suspension and having a light emitting surface facing the laser-facing surface of the slider, each of the at least one laser having an optic axis substantially parallel to the suspension, the at least one laser providing energy substantially along the optic axis and being optically coupled with the EAMR transducer via free space, the at least one EAMR transducer receiving the energy from the at least one laser and writing to the media using the energy;

wherein the at least one laser is oriented such that the optic axis is at a nonzero angle from a perpendicular to the laser-facing surface of the slider.

2. The EAMR disk drive of claim 1 further comprising:
optics for directing the energy from the at least one laser to the at least one EAMR transducer, the optics receiving the energy from the laser via the free space.

3. An energy assisted magnetic recording (EAMR) disk drive comprising:
a suspension,
a slider having a back side, a laser-facing surface, and an air-bearing surface (ABS) opposite the back side, the slider being mounted to the suspension on the back side, the laser-facing surface being substantially perpendicular to the suspension;
at least one EAMR transducer coupled with the slider, at least a portion of the EAMR transducer residing in proximity to the ABS and on the laser-facing surface of the slider; and
at least one laser coupled with the suspension and having a light emitting surface facing the laser-facing surface of the slider, each of the at least one laser having an optic axis substantially parallel to the suspension, the at least one laser providing energy substantially along the optic axis and being optically coupled with the EAMR transducer via free space, the at least one EAMR transducer receiving the energy from the at least one laser and writing to the media using the energy;
wherein the laser is a laser diode including an N-side and a P-side opposite to the N-side.

4. The EAMR disk drive of claim 3 wherein each of the at least one laser further includes a mounting surface joining the N-side and the P-side, each of the at least one laser being mounted to the suspension by the mounting surface.

5. The EAMR disk drive of claim 4 wherein the N-side and the P-side are substantially perpendicular to the suspension.

6. The EAMR disk drive of claim 1 wherein the EAMR transducer further includes:
at least one waveguide optically coupled with the at least one laser.

7. The EAMR disk drive of claim 6 wherein the at least one waveguide further includes:
at least one tapered portion for focusing the energy, the at least one tapered portion including a waveguide optic axis substantially parallel to the laser-facing surface of the slider.

8. The EAMR disk drive of claim 7 wherein the at least one waveguide further includes:
at least one bending portion optically coupled with the at least one tapered portion, the at least one bending portion for redirecting the energy.

9. The EAMR disk drive of claim 8 wherein the at least one bending portion redirects the energy by at least thirty and not more than one hundred twenty degrees.

10. An energy assisted magnetic recording (EAMR) disk drive comprising:
a suspension,
a slider having a back side, a laser-facing surface, and an air-bearing surface (ABS) opposite the back side, the slider being mounted to the suspension on the back side, the laser-facing surface being substantially perpendicular to the suspension;
at least one EAMR transducer coupled with the slider, at least a portion of the EAMR transducer residing in proximity to the ABS and on the laser-facing surface of the slider; and
at least one laser coupled with the suspension and having a light emitting surface facing the laser-facing surface of the slider, each of the at least one laser having an optic axis substantially parallel to the suspension, the at least one laser providing energy substantially along the optic axis and being optically coupled with the EAMR transducer via free space, the at least one EAMR transducer receiving the energy from the at least one laser and writing to the media using the energy;
at least one waveguide optically coupled with the at least one laser, the at least one waveguide including at least one tapered portion and at least one bending portion, the at least one tapered portion for focusing the energy, the at least one tapered portion including a waveguide optic axis substantially parallel to the laser-facing surface of the slider, the at least one bending portion optically coupled with the at least one tapered portion and for redirecting the energy;
wherein the at least one bending portion redirects the energy by at least one hundred twenty and not more than one hundred ninety degrees.

11. The EAMR disk drive of claim 1 wherein the at least one EAMR transducer further includes:
a grating coupled with the slider and receiving the energy from the at least one laser, the grating having a grating optic axis substantially parallel to the laser-facing surface of the slider;
at least one waveguide optically coupled with the at least one grating;
at least one near-field transducer optically coupled with the at least one waveguide, the at least one near-field transducer for heating a region of a recording media; and
at least one magnetic recording pole configured to provide a write field in the region of the magnetic recording media during heating.

12. An energy assisted magnetic recording (EAMR) disk drive comprising:
a suspension,
a slider having a back side, a laser-facing surface, and an air-bearing surface (ABS) opposite the back side, the slider being mounted to the suspension by the back side, the laser-facing surface being substantially perpendicular to the suspension;
at least one EAMR transducer coupled with the slider, at least a portion of the EAMR transducer residing in proximity to the ABS and on the laser-facing surface of the slider, the EAMR transducer including a waveguide having at least one tapered portion and at least one bending portion optically coupled with the at least one tapered portion, the at least one tapered portion for focusing energy and including a waveguide optic axis substantially parallel to the laser-facing surface of the slider, the at least one bending portion for redirecting the energy; and
at least one laser having a light emitting surface facing the laser-facing surface of the slider, an N-side, a P-side, and mounting surface joining the N-side and the P-side, the at least one laser being mounted to the suspension by the mounting surface, each of the at least one laser having an optic axis substantially parallel to the suspension and at a nonzero angle from a perpendicular to the laser-facing surface of the slider, the at least one laser providing the energy substantially along the optic axis and being optically coupled with the EAMR transducer via free space, the at least one EAMR transducer receiving the energy from the laser and writing to the media using the energy.

13. A method for providing an energy assisted magnetic recording (EAMR) disk drive comprising:
   providing a suspension,
   providing a slider having a back side, a laser-facing surface, and an air-bearing surface (ABS) opposite the back side, the laser-facing surface being substantially perpendicular to the suspension;
   providing at least one EAMR transducer coupled with the slider, at least a portion of the EAMR transducer residing in proximity to the ABS and on the laser-facing surface of the slider;
   mounting the back side of the slider on the suspension; and
   coupling at least one laser with the suspension, the at least one laser having a light emitting surface facing the laser-facing surface of the slider, each of the at least one laser having an optic axis substantially parallel to the suspension, each of the at least one laser providing energy substantially along the optic axis and being optically coupled with the EAMR transducer via free space, the at least one EAMR transducer receiving the energy from the at least one laser and writing to the media using the energy;
   wherein the at least one laser is oriented such that the optic axis is at a nonzero angle from a perpendicular to the laser-facing surface.

14. The method of claim 13 further comprising:
   providing optics for directing the energy from the at least one laser to the at least one EAMR transducer, the optics receiving the energy from the laser via the free space.

15. A method for providing an energy assisted magnetic recording (EAMR) disk drive comprising:
   providing a suspension,
   providing a slider having a back side, a laser-facing surface, and an air-bearing surface (ABS) opposite the back side, the laser-facing surface being substantially perpendicular to the suspension;
   providing at least one EAMR transducer coupled with the slider, at least a portion of the EAMR transducer residing in proximity to the ABS and on the laser-facing surface of the slider;
   mounting the back side of the slider on the suspension; and
   coupling at least one laser with the suspension, the at least one laser having a light emitting surface facing the laser-facing surface of the slider, each of the at least one laser having an optic axis substantially parallel to the suspension, each of the at least one laser providing energy substantially along the optic axis and being optically coupled with the EAMR transducer via free space, the at least one EAMR transducer receiving the energy from the at least one laser and writing to the media using the energy;
   wherein each of the at least one laser is a laser diode including an N-side and a P-side opposite to the N-side.

16. The method of claim 15 wherein each of the at least one laser further includes a mounting surface joining the N-side and the P-side, and wherein the step of coupling the at least one laser with the suspension further includes:
   mounting the at least one laser to the suspension by the mounting surface.

17. The method of claim 16 wherein the N-side and the P-side are substantially perpendicular to the suspension.

18. The method of claim 13 wherein the step of providing the at least one EAMR transducer further includes:
   providing at least one waveguide optically coupled with the laser.

19. The method of claim 18 wherein the step of providing the at least one waveguide further includes:
   providing at least one tapered portion for focusing the energy, the at least one tapered portion including a waveguide optic axis substantially parallel to the laser-facing surface of the slider.

20. The method of claim 19 wherein the step of providing the at least one waveguide further includes:
   providing at least one bending portion optically coupled with the at least one tapered portion, the at least one bending portion for redirecting the energy.

21. The method of claim 20 wherein the at least one bending portion redirects the energy by at least thirty and not more than one hundred twenty degrees.

22. A method for providing an energy assisted magnetic recording (EAMR) disk drive comprising:
   providing a suspension,
   providing a slider having a back side, a laser-facing surface, and an air-bearing surface (ABS) opposite the back side, the laser-facing surface being substantially perpendicular to the suspension;
   providing at least one EAMR transducer coupled with the slider, at least a portion of the EAMR transducer residing in proximity to the ABS and on the laser-facing surface of the slider;
   providing at least one waveguide optically coupled with the laser, the step of providing the at least one waveguide further includes:
      providing at least one tapered portion for focusing the energy, the at least one tapered portion including a waveguide optic axis substantially parallel to the laser-facing surface of the slider; and
      providing at least one bending portion optically coupled with the at least one tapered portion, the at least one bending portion for redirecting the energy by at least thirty and not more than one hundred twenty degrees
   mounting the back side of the slider on the suspension; and
   coupling at least one laser with the suspension, the at least one laser having a light emitting surface facing the laser-facing surface of the slider, each of the at least one laser having an optic axis substantially parallel to the suspension, each of the at least one laser providing energy substantially along the optic axis and being optically coupled with the EAMR transducer via free space, the at least one EAMR transducer receiving the energy from the at least one laser and writing to the media using the energy
   wherein the at least one bending portion redirects the energy by at least one hundred twenty and not more than one hundred ninety degrees.

23. The method of claim 13 wherein the step of providing the at least one EAMR transducer further includes:
   providing a grating coupled with the slider and receiving the energy from the at least one laser, the grating having a grating optic axis substantially parallel to the laser-facing surface of the slider;
   providing at least one waveguide optically coupled with the at least one grating;
   providing at least one near-field transducer optically coupled with the at least one waveguide, the at least one near-field transducer for heating a region of a recording media; and
   providing at least one magnetic recording pole configured to provide a write field in the region of the magnetic recording media during heating.

* * * * *